US008974710B2

(12) United States Patent
Blok et al.

(10) Patent No.: US 8,974,710 B2

(45) Date of Patent: Mar. 10, 2015

(54) PELLET MILL HAVING IMPROVED CONSTRUCTION

(75) Inventors: Jesper Blok, Bramming (DK); Tomas Kiré Hørdum, Oksbøl (DK); Steen G. Lassen, Esbjerg V (DK)

(73) Assignee: Andritz AG, Graz (AU)

( * ) Notice: Subject to any disclaimer, the term of this patent is extended or adjusted under 35 U.S.C. 154(b) by 0 days.

(21) Appl. No.: 14/114,714

(22) PCT Filed: Apr. 27, 2012

(86) PCT No.: PCT/EP2012/057723

§ 371 (c)(1), (2), (4) Date: Jan. 31, 2014

(87) PCT Pub. No.: WO2012/146696

PCT Pub. Date: Nov. 1, 2012

(65) Prior Publication Data

US 2014/0138869 A1 May 22, 2014

(30) Foreign Application Priority Data

Apr. 29, 2011 (EP) .................................... 11164246
Apr. 29, 2011 (EP) .................................... 11164249
Apr. 29, 2011 (EP) .................................... 11164251

(51) Int. Cl.
*B30B 11/20* (2006.01)
*B29B 9/06* (2006.01)

(52) U.S. Cl.
CPC .................................... *B30B 11/208* (2013.01)
USPC ............ 264/118; 264/141; 264/142; 425/331

(58) Field of Classification Search
None
See application file for complete search history.

(56) References Cited

U.S. PATENT DOCUMENTS 2,626,576 A 1/1953 Meakin
2,887,718 A 5/1959 Curran et al.

(Continued)

FOREIGN PATENT DOCUMENTS

DE 77 14 334 8/1977
DE 29 17 453 11/1980

(Continued)

OTHER PUBLICATIONS

International Search Report for PCT/EP2012/057723, dated Jun. 26 2012.

(Continued)

*Primary Examiner* — Mary F Theisen

(74) *Attorney, Agent, or Firm* — Stephen J. Weyer, Esq.; Stites & Harbison, PLLC

(57) ABSTRACT

The present invention provides a pellet mill (20) for preparing pellets from a pelletizable material supplied to the pellet mill (20), comprising a frame (22), a main axle (28) rotatably mounted in said frame (22) and having a first end (30) and an opposite second end (32), an annular die (42) being supported by said second end (32) and having an inner surface (44) for receiving a portion of said pelletizable material (106) supplied to said pellet mill (20), an outer surface (46), and a plurality of radial channels (48) extending from said inner surface (44) to said outer surface (46) for preparing pellets from said portion of said pelletizable material (106), a roller holder (54) supported by said frame (22), a number of roller axles (64), each of said number of roller axles being moveably mounted in said roller holder (54), said roller axles may move in said roller holder (54) in the event of an overload to prevent damage to the pellet mill, a number of rollers (80), each of said number of rollers being rotatable around a corresponding one of said number of roller axles (64), each of said number of rollers (80) being adapted to press said portion of pelletizable material (106) against said inner surface (44) for rolling, in response to rotation of said annular die (42), along said inner surface (44) of said annular die (42) for forcing said portion of said pelletizable material (106) from said inner surface (44) to said outer surface (46) through at least one of said plurality of radial channels (48) for preparing said pellets, and a number of actuators (114), each of said number of actuators (114) being operatively connected to a corresponding one of said number of roller axles (64) and being adapted to prevent movement of said corresponding one of said number of roller axles (64) relative to said die holder (54) for maintaining a distance between a corresponding one of said number of rollers (80) and said inner surface (44) of said annular die (42).

20 Claims, 5 Drawing Sheets

(56) References Cited

U.S. PATENT DOCUMENTS

Figure 1:
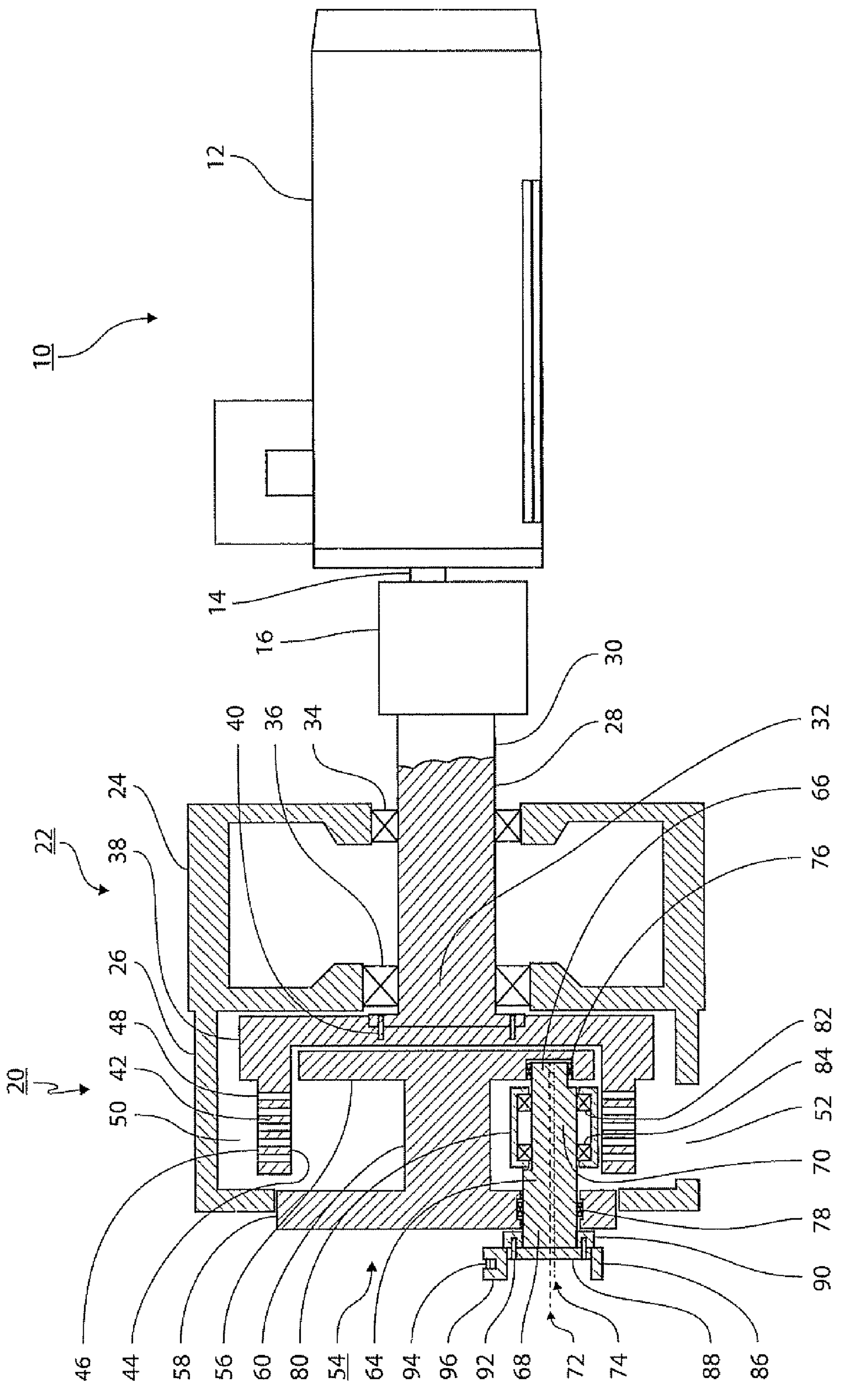

| | | | | |
|---|---|---|---|---|
| 3,679,343 | A * | 7/1972 | Gilman | 425/331 |
| 4,770,621 | A | 9/1988 | Groebli et al. | |
| 4,838,779 | A | 6/1989 | Vries | |
| 4,861,529 | A | 8/1989 | Groebli et al. | |
| 5,248,469 | A | 9/1993 | Wilhelm | |
| 6,244,850 | B1 | 6/2001 | Van Benthum | |
| 7,241,128 | B2 | 7/2007 | Blok | |

FOREIGN PATENT DOCUMENTS

| | | |
|---|---|---|
| EP | 0 396 200 | 11/1990 |
| EP | 0 694 380 | 1/1996 |
| EP | 2 105 292 | 9/2009 |
| FR | 2 548 957 | 1/1985 |
| GB | 989603 | 4/1965 |
| NL | 8901038 | 11/1990 |

OTHER PUBLICATIONS

Written Opinion of the International Searching Authority for PCT/EP2012/057723 dated Apr. 27, 2012.

Applicant response to Written Opinion dated Aug. 27, 2013.

International Preliminary Report on Patentability for PCT/EP2012/057723 dated Sep. 18, 2013.

* cited by examiner

PELLET MILL HAVING IMPROVED CONSTRUCTION

TECHNICAL FIELD

Pellet mills are generally known for pelletizing raw materials, foodstuffs, feedstuffs and more recently biofuels. The pelletizing process results in the transformation of a solid powdery or pasty material into hard pellets or granules which are easier to handle for a consumer than the unpelletized materials. A popular type of pellet mill comprises a rotating annular die, into the interior of which the raw material to be pelletized is fed, and one or more cylindrical rollers rolling along the interior surface of the annular die to compress the raw material and force the raw material through bores in the annular die, the bores extending from the interior surface of the annular die to the exterior surface of the annular die. The raw material which is compressed enters these bores and emerges as rods of raw material, which rods are cut into pellets by a knife positioned adjacent to the outer surface of the annular die, the knife being held stationary. An enclosure is typically provided around the annular die for catching the pellets and funneling the pellets towards a bottom outlet provided beneath the annular die, from where the pellets are collected for subsequent processing.

Depending on the type of raw material being pelletized, the raw material may be pre-treated such as by soaking, heating, or steam treatment, and the pressing action of the rollers may also heat the material.

In the popular type of pellet mill described above, the annular die is mounted at one end of a rotating main axle mounted in a frame and driven by a motor unit. The roller holder is in turn mounted to one end of a roller holder axle which is coaxial with the main axle and extends throughout the main axle. The other end of the roller holder axle is connected to the frame by a torque limiter. This allows the roller holder axle to remain stationary, i.e. non-rotating, relative to the annular die and the frame during normal operation of the pellet mill, and also allows the roller holder axle to rotate with the rotating annular die in the event of an overload, whereby the pellet mill is protected from damage. An overload event may occur if the amount of raw material fed to the pellet mill is beyond the capacity of the pellet mill, whereby the raw material in the annular die causes the rollers to seize against the annular die causing a high strain on the motor unit and large loads on the annular die, the rollers and the other components of the pellet mill.

However, also during normal operation, heavy loads act on the components of the pellet mill. Particularly the roller holder axle bearings which suspend the roller holder axle within the main axle are subjected to high loads, as the raw material to be compressed is pressed between the rollers (which are mounted on the roller holder and hence the roller holder axle) and the annular die (which is mounted on the main axle). Ideally, where the rollers are evenly spaced along the inner surface of the annular die and where each roller would receive the same amount of material, the forces between the rollers and the annular die would cancel out. In this ideal situation, the load on the roller axle bearings would be reduced to simply the weight of the roller holder with rollers. In practice, however, this ideal situation is never achieved and therefore the rollers are loaded differently requiring that the roller holder axle bearings are always sufficiently oversized to ensure a sufficient service life before replacement of the roller holder axle bearings.

The oversizing of the roller holder axle bearings, while providing a useful service life between overhauls of the pellet mill, however, results in a disadvantage in the construction of the pellet mill. The oversized roller holder axle bearings, which are provided within the main axle, necessitate very large main axle bearings for rotatably suspending the main axle in the frame. Using very large main axle bearings are, however, uneconomical as the main axle bearings are subjected to significantly lower loads, which could have been carried by much smaller main axle bearings than the roller holder axle bearings.

A further disadvantage of the construction of the popular type of pellet mill is that the safety feature provided by the possible co-rotation of the roller holder with the annular die inconveniences the provision of an adjustment mechanism for adjusting the distance between the rollers and the inner surface of the annular die as is often desired. Such adjustment mechanisms, as exemplified in U.S. Pat. No. 4,770,621, EP396200, GB989603, U.S. Pat. No. 4,838,779, U.S. Pat. No. 5,248,469, EP2105292, U.S. Pat. No. 6,244,850, WO2004073963A1 and DE2917453 are often complex as they must be carried by and controlled through the roller holder and/or may require special precautions for preventing damage to the adjustment mechanism if the roller holder axle begins to rotate with the main axle due to an overload event.

The above mentioned safety feature further precludes the placing of a feeding mechanism, for feeding raw material into the annular die, in any position which may be occupied by the rollers or the roller holder if the roller holder axle begins to rotate with the main axle due to an overload event. This inconveniences the feeding of raw material evenly to the rollers with the result that the rollers are differently loaded as described above.

In FR 2 548 957 is disclosed a pellet mill having an annular die and rollers rolling along the inner side of the annular die. Each roller revolves around a corresponding eccentric bushing. Each eccentric bushing is mounted around a corresponding roller axle. One end of each roller axle is mounted in a roller holder. A gear is providing for turning the eccentric bushing to adjust the distance between the roller and the annular die. A shear pin is positioned between a gear, for adjusting the position of the rollers, and the eccentric bushing. The shear pin is configured to shear in the event of an accidental blocking of the system.

In EP 0 694 380 is disclosed a pellet mill in which the rollers with their roller axles and motors are connected at a fixed angle to a basic frame on the side of the die facing away from the carrier shaft around which the annular die and the holder for the annular die rotates. The annular die and the rollers are driven by respective motors to provide a predeterminable slip between the rollers and the annular die.

In DE 77 14 334 is disclosed a pellet mill in which roller axles carrying rollers are mounted in a frame. The rollers protrude from the frame, and by moving one of the roller axles inwards to a first position, an annular die can be slipped over the roller so that it covers the rollers. The roller axle in the first position is then moved out to a second position corresponding to the position of normal use in which all rollers contact the inside of the annular die. There is thus no need for a main axle or die holder, instead the annular die is held in position during use by the rollers.

Yet a further disadvantage inherent from the construction of the popular type of pellet mill is that the coaxial arrangement of the roller holder axle within the main axle is possible only if the components of the pellet mill have small tolerances on their dimensions, thus requiring the pellet mill to be assembled from carefully selected components in order to ensure proper function. The coaxial arrangement further requires that the rotating main axle, which surrounds the normally non-rotating roller holder axle, is driven by the motor unit via a belt, chain or a gear provided around the main axle, thus inconveniencing service of the pellet mill. The belt, chain or gear further, unless properly covered, poses a risk for the personnel operating the pellet mill. In addition, the use of a belt, chain or gear may cause the main axle bearings to be non-uniformly loaded due to the tension needed in the belt or chain and the thrust generated by the gear.

It is thus an object of the present invention to provide a simpler and more economical construction of a pellet mill.

A further object of the present invention is to facilitate the provision of an adjustment mechanism for adjusting the distance between the rollers and the inner surface of the annular die in a pellet mill.

Yet a further object of the present invention is to facilitate the provision of a feeding mechanism for feeding raw material to the annular die in a pellet mill.

These and further objects are achieved by a first aspect of the present invention pertaining to a pellet mill, for preparing pellets from a pelletizable material supplied to the pellet mill, comprising

- a frame,
- a main axle rotatably mounted in the frame and having a first end and an opposite second end,
- an annular die being supported by the second end and having an inner surface for receiving a portion of the pelletizable material supplied to the pellet mill, an outer surface, and a plurality of radial channels extending from the inner surface to the outer surface for preparing pellets from the portion of the pelletizable material,
- a roller holder supported by the frame,
- a number of roller axles, each of the number of roller axles being moveably mounted in the roller holder, the roller axles may move in the roller holder in the event of an overload to prevent damage to the pellet mill,
- a number of rollers, each of the number of rollers being rotatable around a corresponding one of the number of roller axles, each of the number of rollers being adapted to press the portion of pelletizable material against the inner surface for rolling, in response to rotation of the annular die, along the inner surface of the annular die for forcing the portion of the pelletizable material from the inner surface to the outer surface through at least one of the plurality of radial channels for preparing the pellets, and,
- a number of actuators, each of the number of actuators being operatively connected to a corresponding one of the number of roller axles and being adapted to prevent movement of the corresponding one of the number of roller axles relative to the die holder for maintaining a distance between a corresponding one of the number of rollers and the inner surface of the annular die.

The roller axles may move in the roller holder such that the distance between each of the number of rollers and the inner surface of the annular die increases in the event of an overload to prevent damage to the pellet mill As the roller holder is supported by the frame instead of being supported by a roller holder axle extending through the main axle, the construction of the pellet mill is simpler. A further advantage derived from the construction of the pellet mill is that the number of bearings may be reduced and each bearing may be dimensioned solely from the loads applied to the specific bearing. This renders the pellet mill more economical.

As the roller holder is supported by the frame it becomes easier to provide an adjustment mechanism for adjusting the distance between the rollers and the inner surface of the annular die in a pellet mill as the control lines do not have to extend through a roller holder axle.

Further, the construction of the pellet mill, particularly the feature of the roller holder being supported by the frame, facilitates the provision of a feeding mechanism for feeding raw material to the annular die in a pellet mill.

Further, as the roller axles are moveably mounted in the roller holder in the pellet mill according to the first aspect of the present invention, the safety feature provided by the roller holder axle in the previously known pellet mill is also present in the pellet mill, namely that the roller axles may move in the event of an overload to prevent damage to the pellet mill according to the first aspect of the present invention.

In the context of the present invention, the term preparing pellets is to be understood as also comprising the preparing of intermediates of pellets, including the preparing of rods or strands of material which are subsequently cut, divided, broken off or otherwise treated to form the final pellet.

In the context of the present invention, the term pelletizable material is to be understood as any material from which pellets may be prepared by forcing the material through a channel in a die. Pelletizable materials include foodstuffs, feedstuff, waste, wood particles etc. The pelletizable material may include additives and/or be treated by heat, soaking or grinding to increase the coherence of the prepared pellets. Preferably the pelletizable material is a biofuel comprising wood particles.

The frame may comprise a main frame part and an auxiliary frame part. The frame may further be supported by a fundament.

The main axle is preferably solid, as there is no roller holder axle extending within the main axle. It is, however, contemplated within the context of the present invention that the main axle may be hollow as this may increase the rigidity of the main axle while lowering the amount of material needed for the main axle. The main axle is preferably made of steel and mounted rotatably in the frame by main axle bearings. The main axle bearings may comprise rolling element bearings. The main axle is preferably substantially horizontal.

The annular die is preferably made of steel. The annular die preferably has a cylindrical shape with open ends. The annular die is preferably positioned so that the rotational axis of the annular die is substantially horizontal.

The pelletizable material may be supplied directly to the inner surface for, or may alternatively be supplied to a point within the annular die from which the pelletizable material may accumulate in the bottom of the annular die due to the force of gravity.

In the context of the present invention, the term a portion of the pelletizable material is to be understood as also comprising a separate amount of the pelletizable material for running the pellet mill in batch mode, as well as the continuous supplying of pelletizable material for running the pellet mill in continuous mode.

The radial channels may have a diameter from 2-20 mm, and may have a uniform diameter or a tapering diameter or inlet, or may have different diameters on the inner and outer side of the annular die.

The radial channels may have a first diameter from the inner surface to a certain position between the inner surface and the outer surface of the annular die, and a second diameter from the certain position to the outer surface of the annular die.

The roller holder preferably comprises a first roller holder plate, a second roller holder plate, and a connecting member. Each of the roller axles is preferably supported with one end of the roller axle supported by the first roller holder plate and the other end of the roller axle being supported by the second roller holder plate.

In the context of the present invention, the term supported by the frame means that the element referred to is stationary relative to the frame. The roller holder may be supported by the frame by being directly attached to the frame, or by being attached to the frame via one or more further elements. Preferably the roller holder is attached to an end plate or door mounted to the frame. The roller axles are preferably made of steel.

In the context of the present invention, the term moveably is to be understood as also comprising rotatably, displaceably, tiltably.

The rollers are preferably made of steel. The rollers may roll, in response to rotation of the annular die, either due to direct contact between the roller and the inner surface of the annular die, or alternatively by contact with the annular die via a layer of pelletizable material present between the roller and the inner surface of the annular die.

The actuators may be linear actuators or rotary actuators.

In the context of the present invention, the term prevent movement is not to be restricted to the meaning that movement is impossible, rather the term is to be understood as also comprising the meaning that movement is prevented until a sufficiently large force is applied to the element referred to, whereby movement can no longer be prevented.

Further, in the context of the present invention, the term maintaining a distance is not to be restricted to the meaning that the distance cannot be changed, rather the term is to be understood as also comprising the meaning that the distance is maintained until a sufficient large force is applied to the element referred to, whereby the distance can no longer be maintained.

In a preferred embodiment of the pellet mill according to the first aspect of the present invention movement of each of the number of roller axles is prevented until a sufficiently large force is applied to the roller axle, whereby movement can no longer be prevented. This is advantageous as it allows the roller axles to move in the event of an overload, corresponding to a sufficiently large force applied to the roller axle, to prevent damage to the pellet mill.

In a preferred embodiment of the pellet mill according to the first aspect of the present invention, each of the number of actuators is further adapted to move the corresponding one of the number of roller axles with respect to the roller holder for changing the distance between the corresponding one of the number of rollers and the inner surface of the annular die. This is advantageous as it allows the pressure exerted by the roller on the pelletizable material to be varied, for example depending on the type of pelletizable material.

The roller axles may be moved by displacing, tilting and/or rotating the roller axles.

In some embodiments of the pellet mill according to the first aspect of the present invention, each of the number of roller axles is moveable by being eccentrically and rotatably mounted in the roller holder, and,

- each of the number of actuators is operatively connected to a corresponding one of the number of roller axles for rotating the corresponding one of the number of roller axles relative to the die holder. This is advantageous as it provides a strong and simple mechanism for changing the distance between the rollers and the inner surface of the annular die.

In the present context, the term eccentrically and rotatably mounted is to be understood as comprising the situation where the axis of rotation, as rotatably mounted, is offset from the geometrical centre axis.

In further embodiments of the pellet mill according to the first aspect of the present invention, each of the number of actuators is operatively interposed between the frame and a corresponding one of the number of roller axles. This is advantageous as it provides a simple way of positioning the actuator. The actuator may be operatively interposed between the frame and a corresponding one of the number of roller axles by being attached to the frame directly, or via a further element, and by being attached to the roller axle directly, or via a further element.

In a preferred embodiment of the pellet mill according to the first aspect of the present invention, the roller holder is attached to an end plate or door mounted to the frame, and each of the actuators (114) are fastened to the end plate (62) or door. This is advantageous as it provides easy access to the actuators, the rollers and the annular die, for maintenance and adjustments In some embodiments of the pellet mill according to the first aspect of the present invention, the pellet mill further comprises

- a number of circular end pieces,
- a number of collars,
- a number of shear pins,
- each of the number of end pieces being connected to an exterior end of a corresponding one of the number of roller axles and having a seat comprising a first connector connected to a portion of a corresponding one of the number of shear pins,
- each of the number of collars being operatively connected to a corresponding one of the number of actuators and encircling a corresponding one of the number of end pieces, each of the number of collars having a second connector connected to a remainder of the corresponding one of the number of shear pins, and
- each of the number of shear pins transferring rotational motion from a corresponding one of the number of collars to a corresponding one of the number of end pieces. This is advantageous as it provides a secure and convenient way of connecting the actuators to the roller axles.

The circular end pieces are preferably made of steel.

The collars are preferably made of steel.

The shear pins are preferably made of steel, but may be made of other metals and alloys for attaining a specific force for shearing the shear pins. The shear pins preferably comprise hollow cylinders.

In the context of the present invention, the term exterior is to be understood as also comprising the situation of the element being referred to being accessible from the exterior.

The seat is preferably positioned on the circumference of the circular end piece and preferably extends in the axial direction of the circular end piece from the surface of the circular end piece.

The first connector is preferably a through-going hole provided in the seat, the length of the hole being no less than the length of the portion of the shear pin.

The second connector is preferably a through-going hole provided in the collar, the length of the hole being no less than the length of the remainder of the shear pin.

In preferred embodiments of the pellet mill according to the first aspect of the present invention, wherein the pellet mill comprises a number of circular end pieces, a number of collars and a number of shear pins, the first connector is a first through-going hole provided in the seat, the length of the first through-going hole is no less that the length of the portion of the shear pin, and the second connector is a second through-going hole provided in the collar, the length of the second through-going hole is no less than the length of the remainder of the shear pin. This is advantageous as it provides easy mounting of the shear pin and easy removal of the remains of a sheared shear pin.

The first and the second through-going hole, respectively, is preferably oriented laterally in relation to the corresponding one of the number of roller axles. More preferably the first and the second through-going hole, respectively, is oriented radially in relation to the corresponding one of the number of roller axles.

In embodiments of the pellet mill according to the first aspect of the present invention, in which embodiments the pellet mill further comprises a number of circular end pieces, a number of collars, and a number of shear pins, each of the number of collars comprises an inner side and an outer side and a stopper provided on the inner side, and, the stopper is engageable by the seat on a corresponding one of the number of end pieces for limiting rotation of the corresponding one of the number of end pieces in the event of shearing of the corresponding one of the number of shear pins. This is advantageous as it prevents excessive rotation of the end piece and thereby excessive rotation of the roller axle.

In embodiments of the pellet mill according to the first aspect of the present invention, in which embodiments the pellet mill further comprises a number of circular end pieces, a number of collars, and a number of shear pins, each of the number of collars further comprising an inner side and an outer side and a stopper, the stopper engages the seat thereby limiting the rotation of the roller axle for preventing the roller axle from rotating past the position of maximum distance between the roller and the inner surface of the annular die for preventing the roller from striking the inner surface (44) of the annular die and damaging the annular die and/or the roller. This is advantageous as it prevents damage to the annular die and/or the roller in the event of shearing of the corresponding one of the number of shear pins, for example due to severe overloading.

The stopper is preferably positioned at a position on the collar 90° offset from the position of the second connector on the collar.

In further embodiments of the pellet mill according to the first aspect of the present invention, each of the number of end pieces further comprises a tapering sleeve, a compression ring, and a tightening mechanism, the exterior end of the corresponding one of the number of roller axles being inserted into the tapering sleeve, the compression ring encircling the tapering sleeve, and the tightening mechanism being adapted to displace the compression ring along the tapering sleeve for engaging the tapering sleeve for clamping the exterior end of the corresponding one of the number of roller axles. This is advantageous as it provides a simple way of attaching the end piece to the roller axle.

The tapering sleeve is preferably attached to one side of the circular end piece and preferably has its larger diameter at its connection to the circular end piece. The wall of the tapering sleeve may comprise slits for simplifying the clamping of the roller axle.

The tightening mechanism may comprise holes in the circular end piece, threaded holes in the compression ring, and bolts connecting the end piece to the compression ring for forcing the compression ring towards the circular end piece for clamping the roller axle.

In embodiments of the pellet mill according to the first aspect of the present invention, each of the number of actuators comprises a hydraulic cylinder. This is advantageous as it provides an actuator having great strength and precise movement. Further, a hydraulic actuator may easily be loaded with fluid at a set pressure for preventing movement of a roller axle, whereby the actuator may allow movement if the forces on the roller axle become large enough to counteract the force exerted by the fluid at the set pressure. The hydraulic cylinder may be single acting or preferably double acting.

In embodiments of the pellet mill according to the first aspect of the present invention, wherein each of the number of actuators comprises a hydraulic cylinder, each of the hydraulic cylinders is loaded with fluid at a set pressure for preventing movement of the corresponding one of the number of roller axles, whereby the actuator allows movement if the forces on the corresponding one of the number of roller axles become large enough to counteract the force exerted by the fluid at the set pressure. This is advantageous as it prevents damage to the pellet mill by allowing the roller axles to move when the force on the roller axle becomes large.

The set pressure may be effected by providing a relief valve connected to the hydraulic cylinders.

In embodiments of the pellet mill according to the first aspect of the present invention, wherein each of the number of actuators comprises a hydraulic cylinder, the hydraulic pressure within the hydraulic cylinder is preset for providing a specific pressure between a corresponding one of the number of rollers and the inner surface of the annular die such that the distance between the corresponding one of the number of rollers and the inner surface of the annular die can increase when an increased amount of the pelletizable material present between the corresponding one of the number of rollers and the inner surface forces the corresponding one of the number of rollers away from the inner surface of the annular die against the hydraulic pressure within the hydraulic cylinder. This is advantageous as it prevents damage to the pellet mill by allowing the roller axles to move when the force on the roller axle becomes large.

Further the preset or set pressure results in a fixed maximum force with which the hydraulic cylinder can hold the rollers against the inner surface of the annular die. This limits the possible maximum imbalance, i.e. the resultant force on the rollers from the annular die and the pelletizable material between each roller and the annular die, by allowing each roller to move away from the inner surface of the annular die when the force on that roller overcomes the force from the pressure within the hydraulic cylinder.

The preset pressure may be effected by providing a relief valve connected to the hydraulic cylinders.

In embodiments of the pellet mill according to the first aspect of the present invention, the first end of the main axle extends outside the frame, and the pellet mill further comprises a motor unit and a coupling, the motor unit supplying rotational movement to the coupling, and, the coupling being adapted to transfer the rotational movement from the motor unit to the first end of the main axle for rotating the main axle.

The coupling may be a rigid coupling such as a sleeve, muff or flange coupling, or may alternatively be a flexible coupling such as a Cardan joint or an Oldham coupler. This is advantageous as it simplifies service of the pellet mill-motor unit assembly. Further, the transferring of rotational movement via a coupling limits risk of the main axle being non-uniformly loaded.

In embodiments of the pellet mill according to the first aspect of the present invention, the pellet mill further comprises:

a die holder operatively interposed between the annular die and the second end of the main axle. This is advantageous as it allows the main axle and the die holder to be manufactured separately which permits the main axle and die holder to be manufactured using simpler methods and further renders the die holder and the main axle less cumbersome to handle during manufacturing.

In embodiments of the pellet mill according to the first aspect of the present invention, the pellet mill further comprises a number of feed conduits extending from outside the pellet mill into the annular die for supplying the pelletizable material to the inner surface of the annular die. This is advantageous as it provides an effective way of supplying the pelletizable material to the inner surface of the die.

The feed conduits preferably supply the pelletizable material to the inner surface of the annular die between the rollers. The feed conduits are further preferably supported directly, or via a further element, by the frame and held stationary relative to the frame. This is advantageous as it facilitates the provision of a feeding mechanism for feeding pelletizable material to the annular die in a pellet mill.

In preferred embodiments of the pellet mill according to the first aspect of the present invention, wherein the pellet mill comprises a number of feed conduits, each of the number of feed conduits is associated with a corresponding one of the number of rollers and each of the number of feed conduits comprises a side opening for feeding the pelletizable material into the substantially wedge-shaped space between the corresponding one of the number of rollers and the inner surface of the annular die, the side opening extending axially along the feed conduit and having an extension that is approximately equal to the length of the corresponding one of the number of rollers, wherein at least one of the feed conduits is configured for feeding the pelletizable material directly to a substantially wedge-shaped space which is at a higher location in the annular die than the at least one of the feed conduits.

This is advantageous because in the pellet mill according to the first aspect of the present invention, the roller holder is supported by the frame and is stationary, even in the event of an overload. Further, the roller axles may move in the roller holder such that the distance between each of the number of rollers and the inner surface of the annular die increases in the event of an overload to prevent damage to the pellet mill. This allows the feed conduits in the preferred embodiments of the pellet mill according to the first aspect of the present invention, wherein the pellet mill comprises a number of feed conduits, to be placed within the annular die between the rollers such that the side opening of each of the number of feed conduits is parallel and aligned axially with the corresponding one of the number of rollers associated with the feed conduit.

By providing a side opening in the feed conduit extending axially along it, and having an extension that is approximately equal to the length of the corresponding one of the number of rollers, an even distribution of the pelletizable material over the outer surface of the rollers is achieved. This causes a more efficient use of the pellet mill, because virtually the full lengths of the rollers are used in the process. Furthermore, an even distribution of the pelletizable material over the full lengths of the rollers gives an even distribution of the load on the individual roller.

In a pellet mill having a number of rollers, wherein the number is at least two, one of the wedge-shaped spaces will be placed at a higher location than the feed conduit feeding pelletizable material to it. Hence, by feeding the pelletizable material directly to a substantially wedge-shaped space, which is at a higher location in the die chamber than said conduit from which it is fed, it is achieved that the pelletizable material is fed directly to the place where it is needed, and the unbalances caused by the pelletizable material having a tendency to accumulate in the bottom of the die chamber are therefore completely alleviated or at least greatly reduced.

In embodiments of the pellet mill according to the first aspect of the present invention, wherein the pellet mill comprises a number of feed conduits, the pellet mill may further comprise means for angular adjustment of each of the feed conduits about its longitudinal axis, thereby adjusting the direction, in which the pelletizable material is expelled through the side opening. Hereby is achieved that the feed of pelletizable material into the die chamber may be accurately adjusted, for example in dependence of the other structural parts of the pellet mill.

Preferably, the conduits have a circular cross section, and each comprises a screw conveyor having a shaft tapering in the direction of feed.

In a preferred embodiment, the pellet mill may further comprise drive means for driving the screw conveyors, which extend into the feed conduits, independently of each other. Hereby is achieved that the quantity of pelletizable material that is fed into the wedge-shaped spaces may be individually adjusted, for example by adjusting the speed of the screw conveyor, or the feeding of pelletizable material to the feed conduits.

Some embodiments of the pellet mill according to the first aspect of the present invention further comprises a knife operatively positioned relative to the outer surface of the annular die for severing said pellets from said outer surface of said annular die. This is advantageous as it allows further treatment of the pellets in the pellet mill and/or ensures uniform dimensions for the pellets.

Preferably the pellet mill according to the first aspect of the present invention comprises a plurality of knives operatively positioned relative to the outer surface of the annular die for severing the pellets from the outer surface of the annular die. One knife may be provided for each roller.

In embodiments of the pellet mill according to the first aspect of the present invention, the number is three. This is advantageous as it allows the forces between the rollers and the annular die to even out.

The above mentioned and further objects are moreover achieved by a second aspect of the present invention pertaining to a method of preparing pellets from a pelletizable material comprising the steps of:

(a) providing a pellet mill, for preparing pellets from a pelletizable material supplied to the pellet mill, comprising a frame, a main axle rotatably mounted in the frame and having a first end and an opposite second end, an annular die being supported by the second end and having an inner surface for receiving a portion of the pelletizable material supplied to the pellet mill, an outer surface, and a plurality of radial channels extending from the inner surface to the outer surface for preparing pellets from the portion of the pelletizable material, a roller holder supported by the frame, a number of roller axles, each of the number of roller axles being moveably mounted in the roller holder, said roller axles may move in said roller holder (54) in the event of an overload to prevent damage to the pellet mill a number of rollers, each of the number of rollers being rotatable around a corresponding one of the number of roller axles, each of the number of rollers being adapted to press the portion of pelletizable material against the inner surface for rolling, in response to rotation of the annular die, along the inner surface of the annular die for forcing the portion of the pelletizable material from the inner surface to the outer surface through the plurality of radial channels for preparing the pellets, and a number of actuators, each of the number of actuators being operatively connected to a corresponding one of the number of roller axles and being adapted to prevent movement of the corresponding one of the number of roller axles relative to the die holder for maintaining a distance between a corresponding one of the number of rollers and the inner surface of the annular die, (b) rotating the main axle, and (c) supplying the pelletizable material to the pellet mill, is provided.

The roller axles may move in the roller holder such that the distance between each of the number of rollers and the inner surface of the annular die increases in the event of an overload to prevent damage to the pellet mill.

Figure 2B:
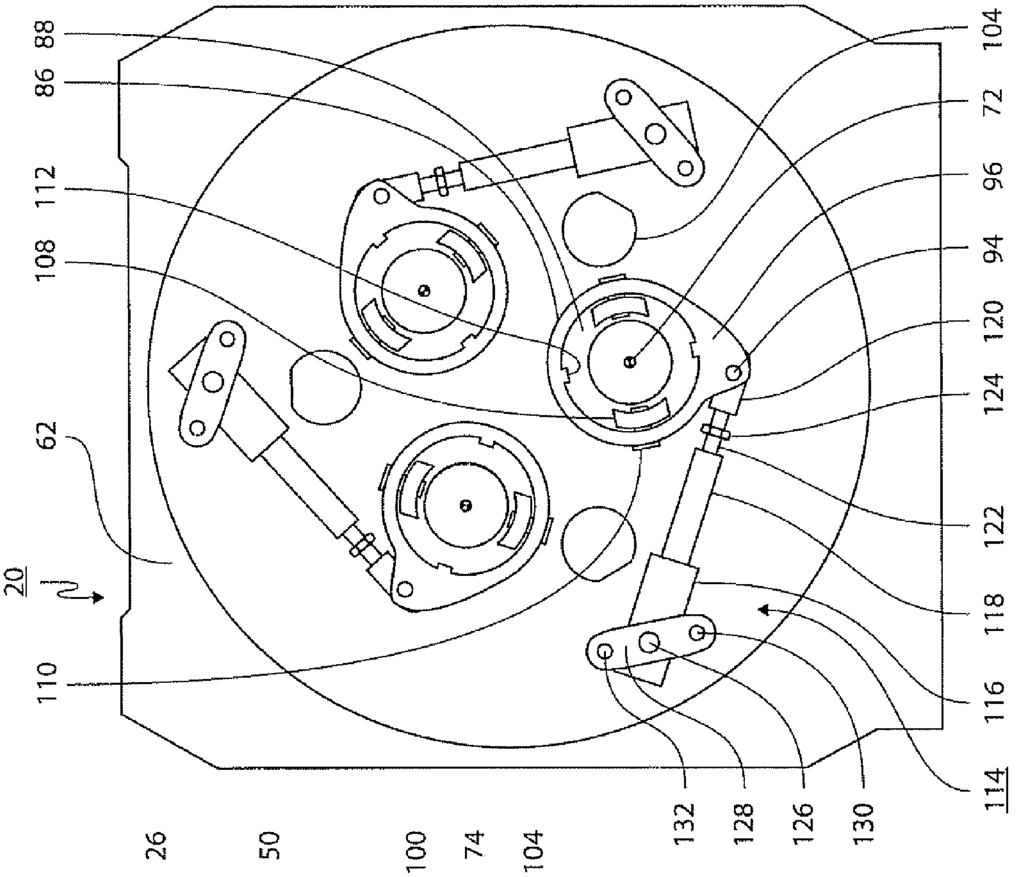
Figure 2A:
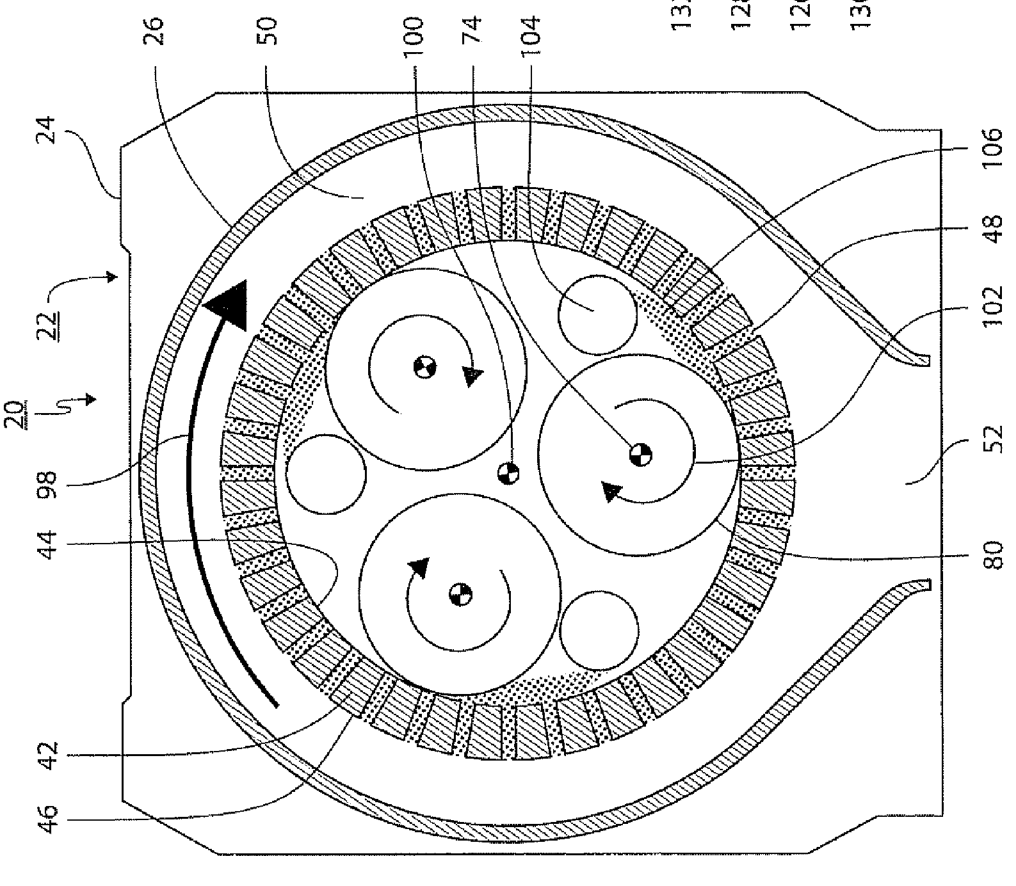
Figure 3:
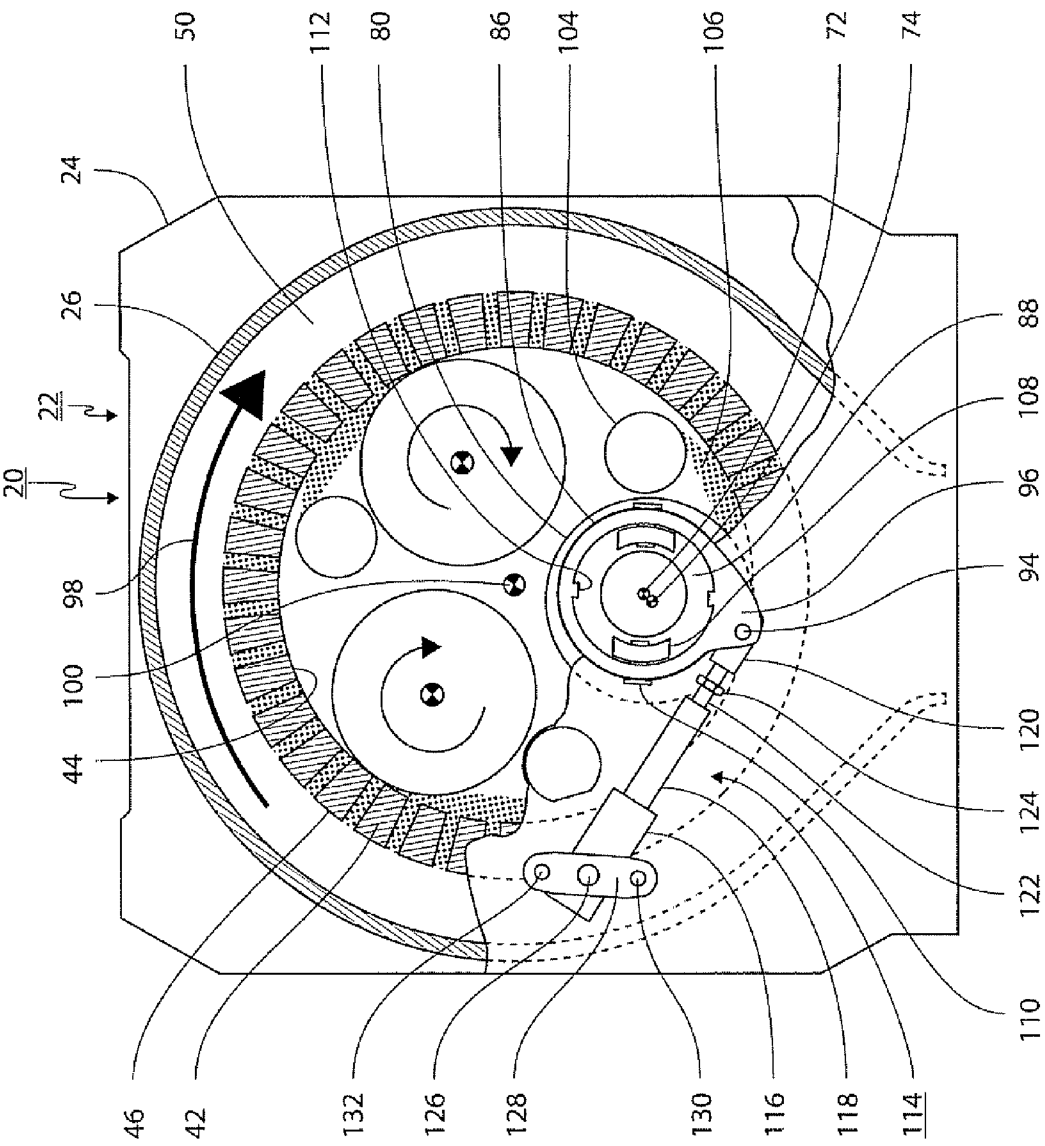
Figure 4B:
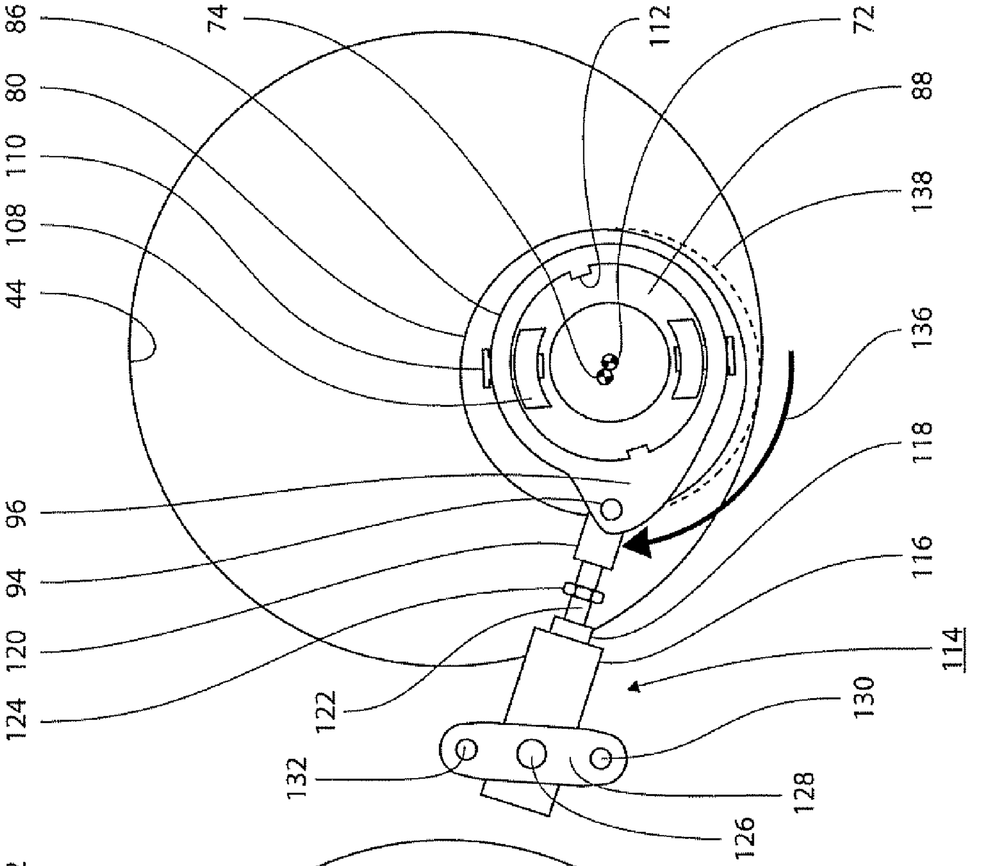
Figure 4A:
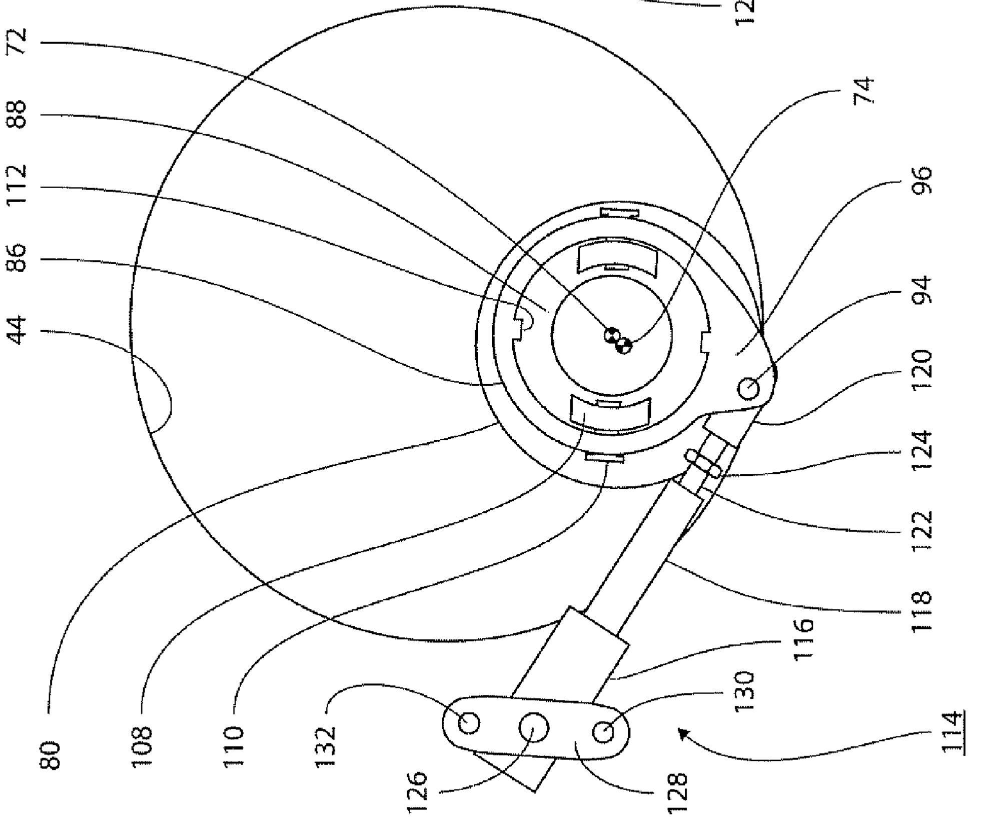
Figure 5:
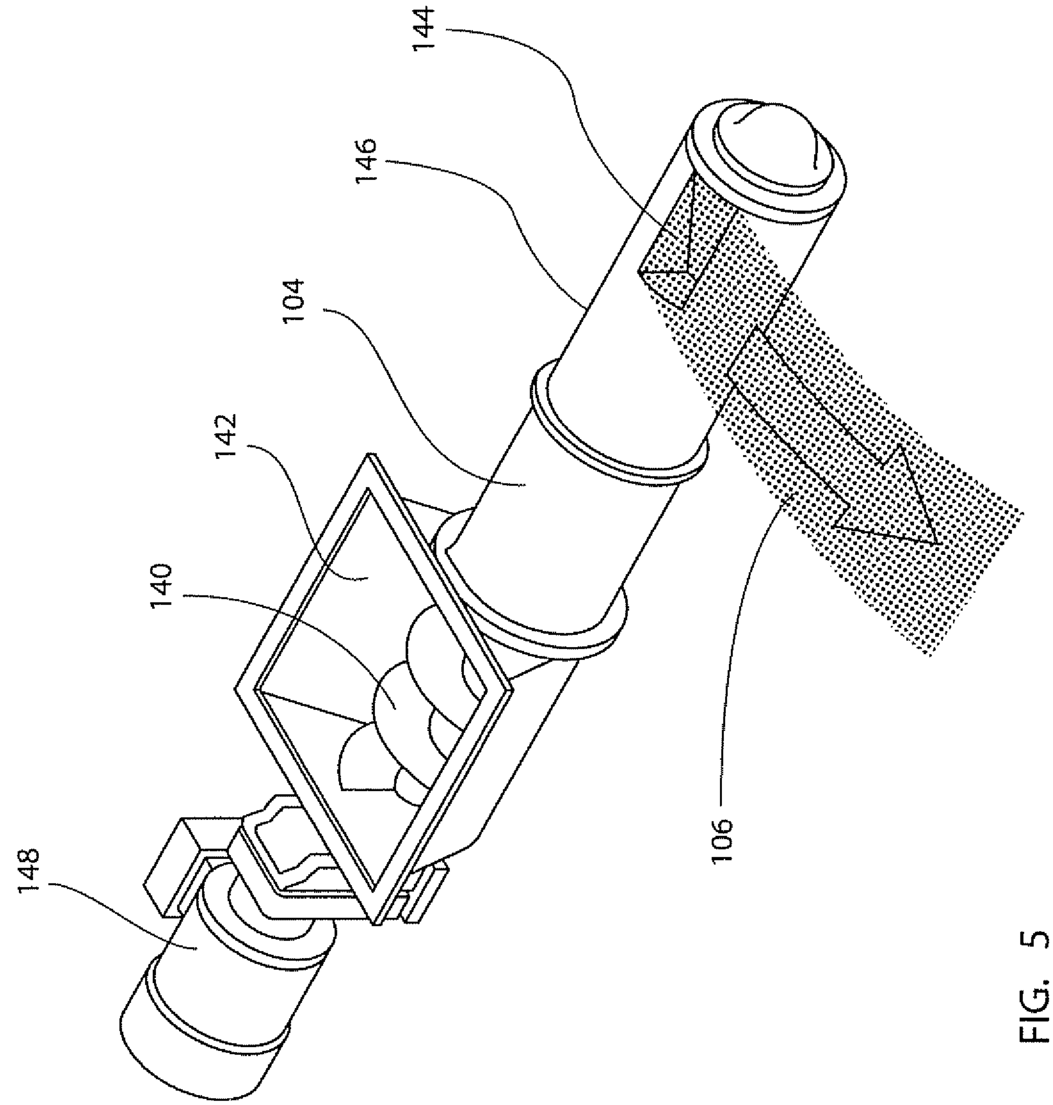

The invention and its many advantages will be described in more detail below with reference to the accompanying schematic drawings, which for the purpose of illustration show some non-limiting embodiments, and in which FIG. 1 shows, in section view, a first embodiment of a pellet mill according to the first aspect of the present invention, FIG. 2 shows, in cross sectional side view, the first embodiment of the pellet mill according to the first aspect of the present invention without (FIG. 2A) and with (FIG. 2B) the end plate, FIG. 3 shows, in partial cutaway side view, the first embodiment of the pellet mill with the end plate, FIG. 4 shows, in side view, the adjustment of a roller relative to an inner surface of the annular die of the pellet mill according to the first aspect of the present invention, and, FIG. 5 shows a feed conduit suitable for use in the pellet mill according to the first aspect of the present invention.

When further embodiments of the invention are shown in the figures, the elements which are new, in relation to earlier shown embodiments, have new reference numbers, while elements previously shown are referenced as stated above. Elements which are identical in the different embodiments have been given the same reference numerals and no further explanations of these elements will be given.

FIG. 1 shows, in section view, a first embodiment of a pellet mill 20 according to the first aspect of the present invention. The pellet mill is driven by a motor unit 10, which will be described in further detail below.

The pellet mill comprises a steel frame 22 being composed of a main frame part 24 and an auxiliary frame part 26. A main axle 28, made from steel, has a first end 30 driven by the motor unit 10, and an opposite second end 32. The main axle 28 is rotatably supported in the main frame part 24 by first and second main axle bearings 34 and 36 respectively, which rotatably support the main axle 28, and a die holder 38 which is mounted to the second end 32 by means of bolts, one of which is designated the reference numeral 40. The die holder carries an annular die 42, having inner and outer surfaces, designated by the reference numerals 44 and 46, respectively, which is made from steel and comprises a plurality of radial channels 48, through which the pelletizable material is pressed as described in more detail below. The annular die 42 is positioned inside a die compartment 50 having a pellet outlet 52 through which pellets produced by the mill are collected. The die compartment 50 is defined by the volume enclosed by the auxiliary frame part 26 and a roller holder, in its entirety designated the reference numeral 54. The roller holder 54 comprises a first roller holder plate 56 connected to a second roller holder plate 58 via a connecting member 60. The connecting member 60 may be integral with the first and/or the second roller holder plates 56 and 58. The roller holder 54 is further attached to the frame 22 of the pellet mill 20 by being attached to the auxiliary frame part 26 by being mounted to an end plate 62, not shown in FIG. 1, as will be described in more detail below. The mounting of the roller holder 54 to the end plate 62 includes bolts or suitable releaseable fasteners to allow the roller holder 54 to be removed from the pellet mill 20 as needed for repairing or exchanging the annular die 42. The roller holder 54 carries at least two roller axles, one of which is shown in FIG. 1 and which is designated the reference numeral 64, which has a first end section 66, and a second end section, representing an exterior end and designating the reference numeral 68. Between the end sections 66 and 68, a middle section 70 is provided. The end sections 66 and 68 have a first centre axis 72 and the middle section has a second centre axis 74, which is offset from the first centre axis 72. The first and second end sections 66 and 68 of the roller axle 64 are rotatably supported in the roller holder 54 by corresponding first and second journal bearings 76 and 78, respectively.

The main frame part 24 and the auxiliary frame part 26 may be displaceable in relation to each other, for example by providing a traverse (not shown) mounted to a rail or beam (not shown) attached to and extending from the main frame part 24, for supporting the auxiliary frame part 26 as it is disengaged from the main frame part (24) and distanced from the main frame part 24 for enabling access to the die compartment 50.

The pellet mill 20 further includes a plurality of rollers, one roller for each roller axle 64. One of the rollers is shown in FIG. 1 and is designated the reference numeral 80, the roller 80 being rotatably supported around the middle section 70 by first and second roller bearings 82 and 84 provided on the middle section 70. The roller axle 64 is eccentrically mounted in the roller holder 54 as the second centre axis 74, around which the roller 80 rotates, is offset from the first centre axis 72, around which the roller axle 64 is rotatably mounted in the roller holder 54.

A collar 86 is connected, as will be further shown below, to an end piece 88 which is attached to the second end section 68 of the roller axle 64 via a compression ring 90 and bolts, one of which is designated the reference numeral 92. The end piece 88 further comprises a tapering sleeve, not shown, which is positioned between the compression ring 90 and the second end section 68 in such a way that tightening of the bolts 92 causes the compression ring 90 to move towards the end piece 88, thereby compressing the tapering sleeve for causing the tapering sleeve to engage the second end section 68 for attaching the end piece 88 to the second end section 68. The collar 86 further comprises a pin 94 provided in a handle part 96 for allowing the rotation of the collar 86 by means of an actuator, as discussed further below.

The motor unit 10 shown in FIG. 1 comprises an electric motor 12 having an output shaft 14 which is connected to the first end 30 of the main axle 28 of the pellet mill 20 via a gearbox 16 and a coupling (not shown).

By attaching the roller holder 54 to the frame 22, the roller holder axle with roller holder axle bearings used in conventional pellet mills may be omitted. Thus, the first and second main axle bearings 34 and 36 can now be dimensioned solely based on the actual loads applied to the first and second main axle bearings 34 and 36, without being unnecessarily overdimensioned due to the now omitted roller holder axle with roller holder axle bearings. The pellet mill 20 is thus simpler and more economical as compared to a conventional pellet mill having a roller holder axle supported within the main axle. The construction of the pellet mill 20 further allows the main axle 28 to be coupled directly to the motor unit 10 as there is no roller holder axle supported within the main axle 28. As the main axle 28 is directly driven by the motor unit 10, there is significantly less non-uniform loading of the first and second main axle bearings 34, 36 as there are no lateral forces, due to the tension needed in a belt or chain for driving a conventional pellet mill. This further allows for providing the motor unit 10 in line with the pellet mill 20, thus simplifying service of a pellet mill assembly comprising the pellet mill 20 and the motor unit 10.

As will be described in further detail below with reference to FIGS. 2-4, the operational safety of the pellet mill 20 matches or surpasses that of conventional pellet mills.

FIG. 2A shows, in cross sectional side view, the pellet mill 20 with annular die 42 and three rollers including the roller 80. The roller holder 54 is not shown in FIG. 2A. The annular die 42 rotates clockwise as indicated by the arrow 98 around a main centre axis 100 corresponding to the centre axis of the main axle 28. During the operation of the pellet mill 20, the roller 80 is caused to rotate clockwise around the second centre axis 74 as indicated by the arrow 102. Three feed conduits, one of which is designated the reference numeral 104 are positioned between the rollers to supply portions of pelletizable material 106 to the rollers. During the operation of the pellet mill 20, the portion of pelletizable material 106 is pressed between the roller 80 and the inner surface 44 of the annular die 42 and pressed through the radial channels 48 to form pellets (not shown). A plurality of knifes (not shown) provided within the die compartment 50 are positioned close to the outer surface 46 of the annular die 42 to sever the pellets from the outer surface 46 of the annular die 42 for allowing the pellets to exit the die compartment 50 through the pellet outlet 52.

As seen in FIG. 2A, the construction of the pellet mill 20 further facilitates the provision of the feed conduits 104. As the roller holder 54 supported by the frame 22 it is stationary, even in the event of an overload, so that the feed conduits 104 may be simply positioned between the rollers, including the roller 80, without risk of being damaged in the event of an overload.

FIG. 2B shows the pellet mill 20 with the end plate 62. The end plate 62 is attached to the auxiliary frame part 26 and carries the roller holder 54 (not shown in FIG. 2B). The collar 86 with handle part 96, as well as the end piece 88, extends through the end plate 62. The end piece 88 further comprises two seats, one of which is designated the reference numeral 108. Rotation of the collar 86 is transferred to the seats 108 via shear pins, one of which is designated the reference numeral 110, extending through corresponding bores (not shown) in the collar 86 and the seats 108. Two oppositely positioned stoppers, one of which is designated the reference numeral 112, are provided within the collar 86 for engaging the seats 108 to prevent excessive rotation of the end piece 88 in the event that the shear pins 110 break, as will be described in further detail below.

Collar 86 may be acted upon by an actuator, in its entirety designated the reference numeral 114, being fastened to the end plate 62. The actuator 114 comprises a hydraulic cylinder 116 in which one end of a piston 118 is positioned such that the supply or withdrawal of hydraulic fluid to the hydraulic cylinder 116 causes the piston 118 to extend or retract relative to the hydraulic cylinder 116. The piston 118 is connected to the handle part 96 of the collar 86 via the pin 94 and a link part 120, which is threadedly connected to the piston 118 via a rod 122, which rod 122 is also threadedly connected to the piston 118. A nut 124 is fastened to the rod 122 for allowing the rod 122 to be rotated for fine tuning/zero point adjustment of the rotational position of the collar 86. The hydraulic cylinder 116 is further connected to the end plate 62 via a pin 126 and a bracket 128, which bracket 128 is fastened to the end plate 62 by bolts 130 and 132.

As seen in FIG. 2B, the construction of the pellet mill 20 facilitates the provision of the actuators 114. As the roller holder 54 is supported by the frame 22 it is stationary, even in the event of an overload. Thus the actuators 114 are not confined to the roller holder 54 but can instead be connected to the frame 22, directly, or as shown in FIG. 2B, via the end plate 62. The function of the actuator 114 will now be described in further detail with reference to FIGS. 3-4.

FIG. 3 shows, in partial cutaway side view, the pellet mill 20 with the end plate 62 partly cut away. Referring to the roller 80, FIG. 3 shows the offset of the second centre axis 74 from the first centre axis 72. The second centre axis 74 is the axis around which the roller 80 rotates, while the first centre axis 72 is the axis around which the first and second end sections 66 and 68 of the roller axle 64 rotate.

The adjustment of the distance between the roller 80 and the inner surface 44 of the annular die 42 is shown in FIGS. 4A-4B. FIG. 4A shows the roller 80 in contact with the inner surface 44 of the annular die 42. In FIG. 4B the actuator 114 has been activated to retract the piston 118 into the hydraulic cylinder 116 thereby pulling on the handle part 96 for turning the collar 86 causing the rotation of the collar 86 as indicated by the arrow designated the reference numeral 136. The turning of the collar 86 is transferred to the end piece 88 via the shear pins 110 causing the roller axle 64 to turn. As the roller axle 64 turns, the second centre axis 74 moves in a clockwise circular motion around the first centre axis 72, whereby the distance between the roller 80 and the inner surface 44 of the annular die 42 increases as indicated by the dashed line indicating the previously occupied position of the roller 80, designated the reference numeral 138. The increase of the distance between the roller 80 and the inner surface 44 of the annular die 42 may, as described above in relation to FIGS. 4A-4B, be deliberate such as upon the detection of an overload event, in which case the distance may be decreased again by extracting the piston 118 for turning the roller axle 64 counter-clockwise and decreasing the distance. The increase of the distance between the roller 80 and the inner surface 44 of the annular die 42 may also be spontaneous due to an increased amount of pelletizable material 106 being present between the roller 80 and the inner surface 44 of the annular die 42, which increased amount of pelletizable material 106 forces the roller 80 away from the inner surface 44 of the annular die 42 against the hydraulic pressure present within the hydraulic cylinder 116 of the actuator 114. The hydraulic pressure may be preset to provide a specific pressure between the roller 80 and the inner surface 44 of the annular die 42. Thus, the pellet mill 20 possesses, by means of the actuator 114 and the roller axle 64, safety features for preventing damage to the pellet mill 20 in the event of an overload event. Further, in the event of extraordinarily severe overloading events or seizures of the pellet mill 20, such as for example being caused by the introduction of a foreign object, such as a forgotten hand tool etc. in the annular die 42, the shear pin 110 prevents damage to the pellet mill 20, particularly to the actuator 114 and the first and second roller bearings 82 and 84, by shearing, thereby allowing the roller axle 64 to rotate to the position where the distance between the roller 80 and the inner surface 44 of the annular die 42 is at a maximum, i.e. when the first centre axis 72 is positioned between the second centre axis 74 and the inner surface 44 of the annular die 42. Even if the shear pin 110 shears, the stopper 112 engages the seat 108 thereby limiting the rotation of the roller axle 64 for preventing the roller axle 64 from rotating past the position of maximum distance between the roller 80 and the inner surface 44 of the annular die 42 for preventing the roller 80 to strike the inner surface 44 of the annular die 42 and potentially damaging the annular die 42 and/or the roller 80 and/or the first and second roller bearings 82 and 84.

FIG. 5 shows a preferred embodiment of the feed conduit 104. The feed conduit 104 shown in FIG. 5 has a circular cross section and comprises a screw conveyor 140 extending from a feed inlet 142 to a side opening 144. The side opening 144 extends axially along a front portion 146 of the feed conduit 104 and the side opening 144 has a length which is approximately equal to the length of the roller 80, so that the pelletizable material 106 ejected laterally through the side opening 144 forms an even distribution of the pelletizable material over the outer surface of the roller 80, i.e. the full length of contact between the roller 80 and the inner surface 44 of the annular die 42.

The screw conveyor 140 has a shaft tapering in the direction of feed and is driven by an electrical motor 148. The electrical motor is preferably set up to run at a set speed whereby adjustment of the amount of pelletizable material 106 to be delivered to each roller 80 is carried out by controlling upstream feed screw units (not shown), one for each feed conduit 104. The feed screw units are controllable for individually portioning out, i.e. feeding, pelletizable material 106 to the feed inlets 142 of the individual feed conduits 104. The feed screw units may receive pelletizable material 106 from a common supply, such as a conditioner unit where the pelletizable material may be heated, steam treated, etc.

If the feed conduit 104 cannot keep up with the amount of pelletizable material 106 being fed to it from the feed screw units its speed must be adjusted, i.e. controlled. Alternatively, or in addition to controlling the feed screw units, the electric motor 148 may be controllable for adjustment of the amount of pelletizable material 106 to be delivered to each roller 80.

The feed conduit 104 provides a very efficient feeding of pelletizable material 106 to the corresponding one of the roller 80 as the pelletizable material 106 is fed, by means of the side opening 144, selectively to the roller 80. The pelletizable material 106 may, depending on the angular adjustment of the feed conduit 104 about its longitudinal orientation, even be fed upwards, such as to a substantially wedge-shaped space formed between a roller 80, positioned at a higher location in the pellet mill than the feed conduit 104, and the inner surface 44 of the annular die 42. Further, the amount of pelletizable material 106 which is fed to each roller 80 can be individually adjusted by individually controlling the feed screw units as described above.

Means (not shown) may be provided for angular adjustment of the feed conduit 104, or only the front portion 146, about the longitudinal axis of the feed conduit 104 for adjusting the direction of the pelletizable material 106 ejected from the side opening 144. The means may include a hydraulic cylinder or servomotors and gears.

The feed conduit 104 may be attached to the end plate 62, the auxiliary frame part 26, or the roller holder 54.

As the roller holder 54 is supported by the frame 22, it is stationary, even in the event of an overload. This allows the feed conduit 104 to be positioned such that the front portion 146 of the feed conduit 104 is positioned within the annular die 42 between the rollers 80 such that the side opening 144 is parallel and aligned axially with the roller 80. This in turn allows the pelletizable material 106 ejected laterally through the side opening 144 to be evenly distributed over the outer surface of the roller 80.

If, as in prior art pellet mills, the roller holder 54 were mounted on a roller holder axle held stationary relative to the frame 22 by a shear pin, an overload event would cause the shear pin to break and the roller holder 54 to rotate relative to the frame, thus destroying the feed conduits 104 which are fastened to the end plate 62.

| List of parts with reference to the figures: |
|---|
| 10. Motor unit |
| 12. Electric motor |
| 14. Output shaft |
| 16. Gearbox |
| 20. Pellet mill |
| 22. Frame |
| 24. Main frame part |
| 26. Auxiliary frame part |
| 28. Main axle |
| 30. First end |
| 32. Second end |
| 34. First main axle bearing |
| 36. Second main axle bearing |
| 38. Die holder |
| 40. Bolt |
| 42. Annular die |
| 44. Inner surface |
| 46. Outer surface |
| 48. Radial channel |
| 50. Die compartment |
| 52. Pellet outlet |
| 54. Roller holder |
| 56. First roller holder plate |
| 58. Second roller holder plate |
| 60. Connecting member |
| 62. End plate |
| 64. Roller axle |
| 66. First end section |
| 68. Second end section |
| 70. Middle section |
| 72. First centre axis |
| 74. Second centre axis |
| 76. First journal bearing |
| 78. Second journal bearing |
| 80. Roller |
| 82. First roller bearing |
| 84. Second roller bearing |
| 86. Collar |
| 88. End piece |
| 90. Compression ring |
| 92. Bolt |
| 94. Pin |
| 96. Handle part |
| 98. Arrow indication direction of rotation |
| 100. Main centre axis |
| 102. Arrow indication direction of rotation |
| 104. Feed conduit |
| 106. Pelletizable material |
| 108. Seat |
| 110. Shear pin |
| 112. Stopper |
| 114. Actuator |
| 116. Hydraulic cylinder |
| 118. Piston |
| 120. Link part |
| 122. Rod |
| 124. Nut |
| 126. Pin |
| 128. Bracket |
| 130. Bolt |
| 132. Bolt |

-continued

| List of parts with reference to the figures: |
|---|
| 134. Arrow indicating direction of rotation |
| 136. Line indicating previously occupied position |
| 140. Screw conveyor |
| 142. Feed inlet |
| 144. Side opening |
| 146. Front portion |
| 148. Electric motor |

The invention claimed is:

1. A pellet mill for preparing pellets from a pelletizable material supplied to the pellet mill, comprising:

a frame, a main axle rotatably mounted in said frame and having a first end and an opposite second end, an annular die being supported by said second end and having an inner surface for receiving a portion of said pelletizable material supplied to said pellet mill, an outer surface and a plurality of radial channels extending from said inner surface to said outer surface for preparing pellets from said portion of said pelletizable material, a roller holder supported by said frame, a number of roller axles, each of said number of roller axles being moveably mounted in said roller holder, a number of rollers, each of said number of rollers being rotatable around a corresponding one of said number of roller axles, each of said number of rollers being adapted to press said portion of pelletizable material against said inner surface for rolling, in response to rotation of said annular die, along said inner surface of said annular die for forcing said portion of said pelletizable material from said inner surface to said outer surface through at least one of said plurality of radial channels for preparing said pellets, said roller axles being adapted to move in said roller holder in the event of an overload such that the distance between each of the number of rollers and the inner surface of the annular die increases to prevent damage to the pellet mill, and a number of actuators, each of said number of actuators being operatively connected to a corresponding one of said number of roller axles and being adapted to prevent movement of said corresponding one of said number of roller axles relative to said die holder for maintaining a distance between a corresponding one of said number of rollers and said inner surface of said annular die, characterized by each of said number of actuators further being adapted to prevent movement of a corresponding one of said number of roller axles until a sufficiently large force, corresponding to the event of an overload, is applied to said roller axle, whereby movement is no longer prevented, and by each of said number of actuators comprising a hydraulic cylinder provided with a relief valve connected to said hydraulic cylinder.

2. The pellet mill according to claim 1, each of said number of actuators further being adapted to move said corresponding one of said number of roller axles with respect to said roller holder for changing said distance between said corresponding one of said number of rollers and said inner surface of said annular die.

3. The pellet mill according to claim 1, each of said number of roller axles being moveable by being eccentrically and rotatably mounted in said roller holder, and, each of said number of actuators being operatively connected to a corresponding one of said number of roller axles for rotating said corresponding one of said number of roller axles relative to said roller holder.

4. The pellet mill according to claim 1, each of said number of actuators being operatively interposed between said frame and a corresponding one of said number of roller axles.

5. The pellet mill according to claim 4, said roller holder being attached to an end plate or door mounted to said frame, and each of said actuators being fastened to said end plate or door.

6. The pellet mill according to claim 3, said pellet mill further comprising a number of circular end pieces, a number of collars, a number of shear pins, each of said number of end pieces being connected to an exterior end of a corresponding one of said number of roller axles and having a seat comprising a first connector connected to a portion of a corresponding one of said number of shear pins, each of said number of collars being operatively connected to a corresponding one of said number of actuators and encircling a corresponding one of said number of end pieces, each of said number of collars having a second connector connected to a remainder of said corresponding one of said number of shear pins, and each of said number of shear pins transferring rotational motion from a corresponding one of said number of collars to a corresponding one of said number of end pieces.

7. The pellet mill according to claim 6, said first connector being a first through-going hole provided in said seat, the length of said first through-going hole being no less that the length of said portion of said shear pin, and said second connector being a second through-going hole provided in said collar, the length of said second through-going hole being no less than the length of said remainder of said shear pin.

8. The pellet mill according to claim 7, said first and said second through-going hole being oriented laterally in relation to said corresponding one of said number of roller axles.

9. The pellet mill according to claim 6, each of said number of collars comprising an inner side and an outer side and a stopper provided on said inner side, and said stopper being engageable by said seat on a corresponding one of said number of end pieces for limiting rotation of said corresponding one of said number of end pieces in the event of shearing of said corresponding one of said number of shear pins.

10. The pellet mill according to claim 9, said stopper being arranged for engaging said seat if the shear pin shears, said stopper and said seat being arranged such that said stopper prevents said roller axle from rotating past the position of maximum distance between said roller and said inner surface of said annular die, thereby limiting the rotation of said roller axle for preventing said roller from striking said inner surface of said annular die and damaging said annular die and/or said roller.

11. The pellet mill according to claim 6, each of said number of end pieces further comprising a tapering sleeve, a compression ring, and a tightening mechanism, said exterior end of said corresponding one of said number of roller axles being inserted into said tapering sleeve, said compression ring encircling said tapering sleeve, and said tightening mechanism being adapted to displace said compression ring along said tapering sleeve for engaging said tapering sleeve for clamping said exterior end of said corresponding one of said number of roller axles.

12. The pellet mill according to claim 1, each of said hydraulic cylinders being adapted to be loaded with fluid at a set pressure for preventing movement of said corresponding one of said number of roller axles, each of said hydraulic cylinders further being adapted to allow movement if the forces on said corresponding one of said number of roller axles become large enough to counteract the force exerted by the fluid at the set pressure.

13. The pellet mill according to claim 1, said first end of said main axle extending outside said frame, said pellet mill further comprising a motor unit and a coupling, said motor unit supplying rotational movement to said coupling, and, said coupling being adapted to transfer said rotational movement from said motor unit to said first end of said main axle for rotating said main axle.

14. The pellet mill according to claim 13, said coupling being rigid, such as a sleeve muff or flange coupling, or alternatively said coupling being flexible, such as a Cardan joint or Oldham coupler.

15. The pellet mill according to claim 1, said pellet mill further comprising a die holder operatively interposed between said annular die and said second end of said main axle.

16. The pellet mill according to claim 1, further comprising a number of feed conduits extending from outside said pellet mill into said annular die for supplying said portion of said pelletizable material supplied to said pellet mill to said inner surface of said annular die.

17. The pellet mill according to claim 1, said number being three.

18. The pellet mill according to claim 1, further comprising a knife operatively positioned relative to said outer surface of said annular die for severing said pellets from said outer surface of said annular die.

19. A method of preparing pellets from a pelletizable material comprising the steps of:

(a) providing a pellet mill, for preparing pellets from a pelletizable material supplied to the pellet mill, comprising a frame, a main axle rotatably mounted in said frame and having a first end and an opposite second end, an annular die being supported by said second end and having an inner surface for receiving a portion of said pelletizable material supplied to said pellet mill, an outer surface, and a plurality of radial channels extending from said inner surface to said outer surface for preparing pellets from said portion of said pelletizable material, a roller holder supported by said frame, a number of roller axles, each of said number of roller axles being moveably mounted in said roller holder, a number of rollers, each of said number of rollers being rotatable around a corresponding one of said number of roller axles, each of said number of rollers being adapted to press said portion of pelletizable material against said inner surface for rolling, in response to rotation of said annular die, along said inner surface of said annular die for forcing said portion of said pelletizable material from said inner surface to said outer surface through at least one of said plurality of radial channels for preparing said pellets, and said roller axles being adapted to move in said roller holder in the event of an overload such that the distance between each of the number of rollers and the inner surface of the annular die increases to prevent damage to the pellet mill, a number of actuators, each of said number of actuators being operatively connected to a corresponding one of said number of roller axles and being adapted to prevent movement of said corresponding one of said number of roller axles relative to said die holder for maintaining a distance between a corresponding one of said number of rollers and said inner surface of said annular die, each of said number of actuators further being adapted to prevent movement of a corresponding one of said number of roller axles until a sufficiently large force, corresponding to the event of an overload, is applied to said roller axle, whereby movement is no longer prevented, each of said number of actuators comprising a hydraulic cylinder provided with a relief valve connected to said hydraulic cylinder, (b) rotating said main axle, and (c) supplying said pelletizable material to said pellet mill.

20. The method according to claim 19, the method further comprising the step of:

(d) presetting the hydraulic pressure within said hydraulic cylinder for providing a specific pressure between a corresponding one of said number of rollers and said inner surface of said annular die such that the distance between said corresponding one of said number of rollers and said inner surface of said annular die can increase when an increased amount of said pelletizable material present between said corresponding one of said number of rollers and said inner surface forces said corresponding one of said number of rollers away from said inner surface of said annular die against the hydraulic pressure within said hydraulic cylinder.

* * * * *